Jan. 5, 1926.
E. GELLY
PROPULSION DEVICE
Filed Jan. 25, 1924
1,568,665
3 Sheets-Sheet 1
Fig. 1.
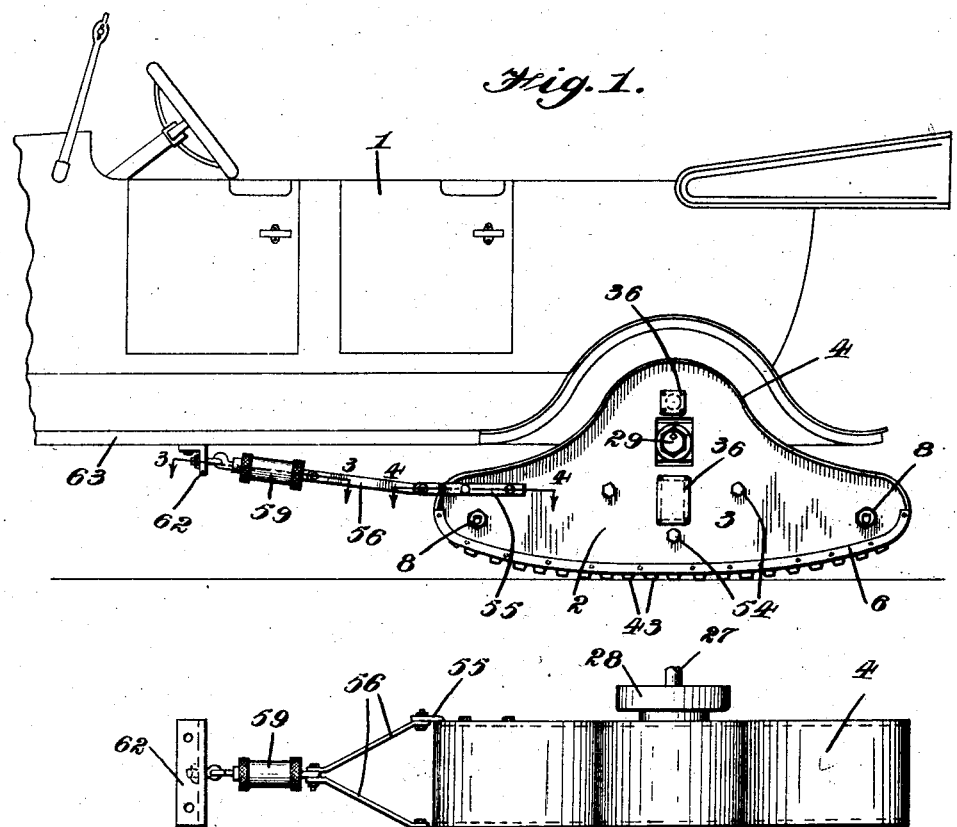
Fig. 2.
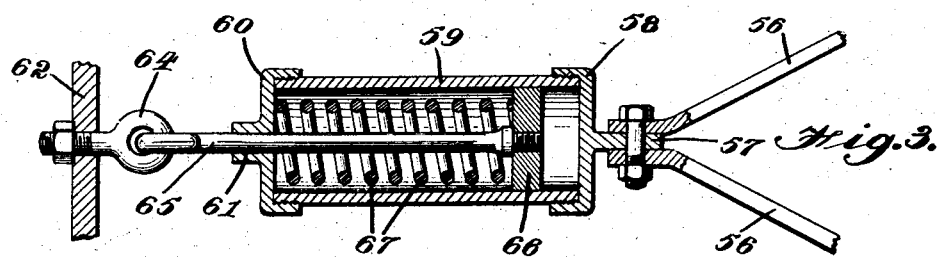
Fig. 3.
Fig. 4.
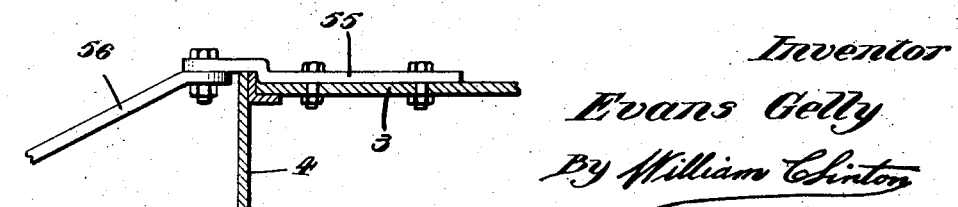
Inventor
Evans Gelly
By William Clinton
Attorney

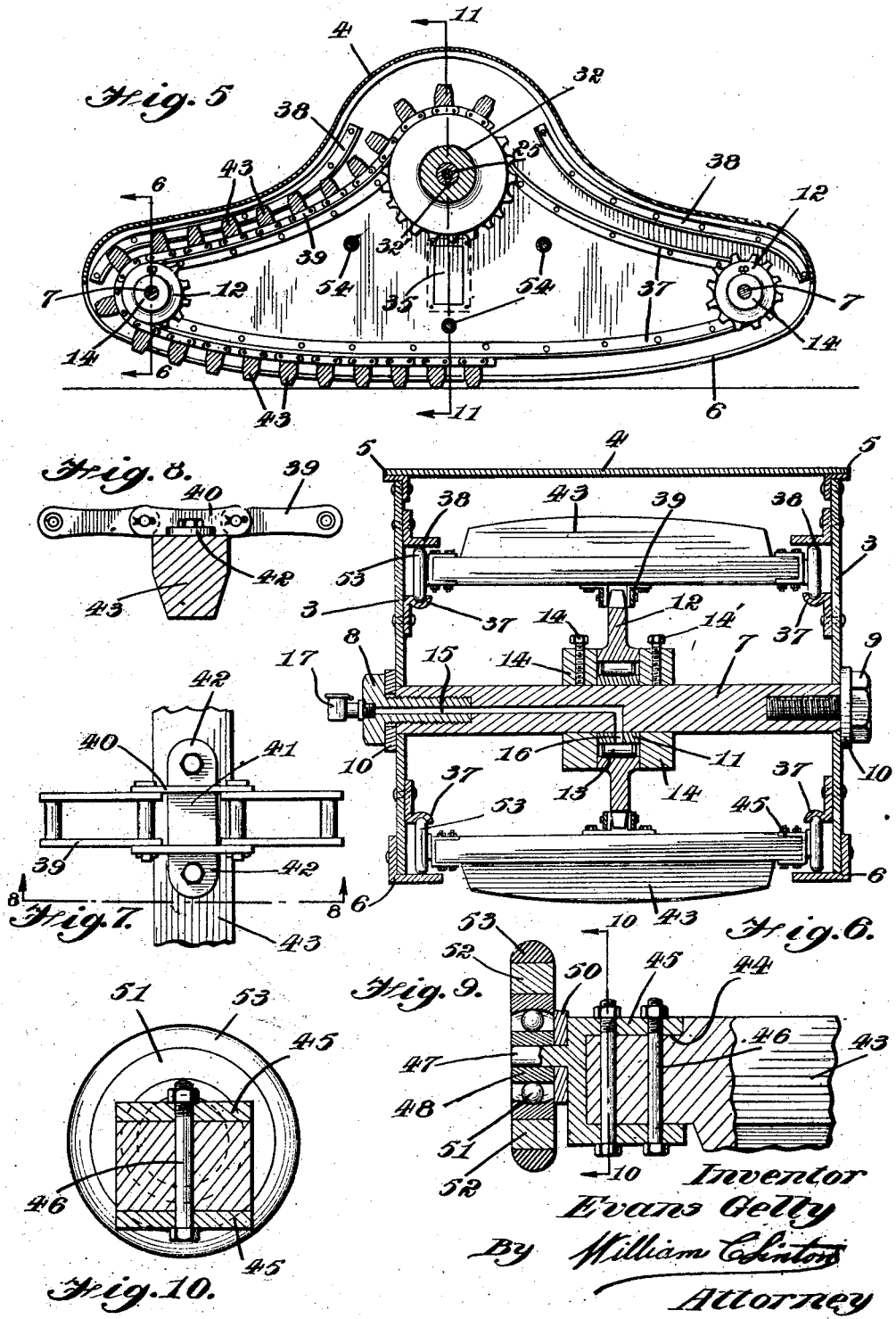

Jan. 5, 1926.  1,568,665
E. GELLY
PROPULSION DEVICE
Filed Jan. 25, 1924   3 Sheets-Sheet 3

Inventor
Evans Gelly
By William Clinton
Attorney

Patented Jan. 5, 1926.

1,568,665

UNITED STATES PATENT OFFICE.

EVANS GELLY, OF QUEBEC, QUEBEC, CANADA.

PROPULSION DEVICE.

Application filed January 25, 1924. Serial No. 688,566.

*To all whom it may concern:*

Be it known that I, EVANS GELLY, subject of the King of Great Britain, residing at Quebec, in the Province of Quebec, Canada, have invented certain new and useful Improvements in Propulsion Devices; and I do hereby declare that the following is a full, clear, and exact description of the invention, such as will enable others skilled in the art to which it appertains to make and use the same.

The present invention relates to new and useful improvements in a propulsion device designed especially to replace wheels of automobiles in winter.

In regions where there is a heavy fall of snow in winter, it is practically impossible to use an automobile without the aid of a special traction device.

The primary object of this invention is the provision of such a device which may be attached to an automobile in place of the wheels, particularly the rear wheels.

A further object of the invention is the provision in a device of this character of means whereby the effective height thereof may be varied to suit the height of the axle or to comply with other requirements.

The invention further includes a means for attaching the device to the chassis of the vehicle in such a manner that it is kept in line with the direction of travel of the vehicle.

The invention is fully disclosed in the following description and in the accompanying drawings in which:

Figure 1 is a side elevation of the device applied to an automobile;

Figure 2 is a plan view of the device;

Figure 3 is a section on the line 3—3 of Figure 1;

Figure 4 is a section on the line 4—4 of Figure 1;

Figure 5 is a longitudinal section of the device;

Figure 6 is a section on the line 6—6 of Figure 5;

Figure 7 is a fragmentary plan view of the tread;

Figure 8 is a section on the line 8—8 of Figure 7;

Figure 9 is a fragmentary enlarged sectional view through the wheel and mounting therefor;

Figure 10 is a section on the line 10—10 of Figure 9;

Figures 11, 12:
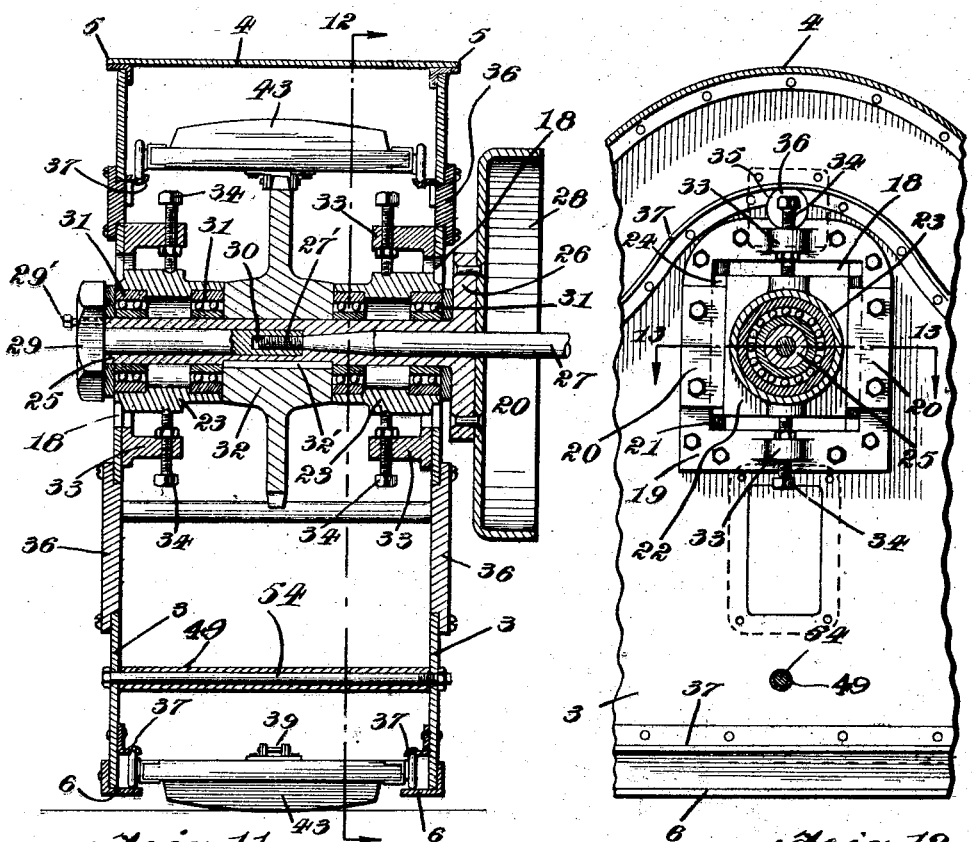
Figure 11 is a section on the line 11—11 of Figure 5.
Figure 12 is a section on the line 12—12 of Figure 11.
Figure 13:
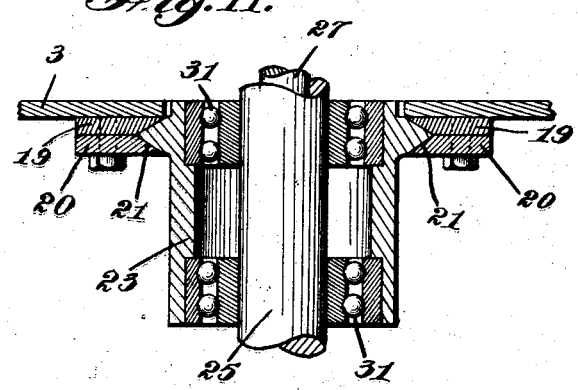
Figure 13 is a section on the line 13—13 of Figure 12.
Figure 14:
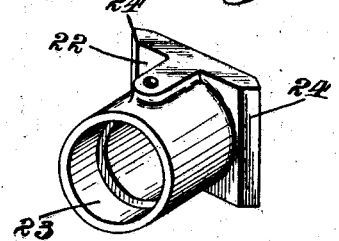
Figure 14 is a perspective view of one of the adjustable axle bearings.

In these views in which like reference characters are employed to designate corresponding parts throughout, the numeral 1 designates a vehicle to which is applied the propulsion device generally designated by the numeral 2. The frame of the device comprises a pair of side plates 3 the upper edges of which are connected by means of a cover plate 4 which extends beyond these edges forming flanges 5 therewith. The lower side of the frame is open, as shown in Figure 6, the lower edges of the side plates having angle bars 6 secured thereto and extending inwardly of the frame to form tracks which are described more particularly below.

At each end of the frame is mounted a shaft 7 which is held rigidly in place by means of bolts 8 and 9 and washers 10. The central portion of each shaft is fitted with a collar 11 upon which is mounted a rotatable sprocket wheel 12, roller bearings 13 being interposed. The sprocket wheel is prevented from lateral shifting by means of collars 14 which are locked in place by set screws 14'. The bolt 8 is formed with an oil passage 15 which communicates with an aperture 16 in the member 11, and an oil cup 17 is screwed into the outer edge of the passage whereby the roller bearing of the sprocket wheel is lubricated.

The ground or upper portion of each side plate is formed with a substantially square opening 18 which is surrounded by a frame 19 bolted to the inner face of the plate. Strips 20 are secured to the vertical sides of the frame, the inner edges of said sides and strips being dovetailed as at 21. A bearing member consisting of a body 22 and sleeve 23 is adapted for movement between the strips 20, the edges of the body being pointed as at 24 for sliding in the dovetails 21. A shaft extension 25 having a flange 26 at its inner end is passed through the sleeves 23 and is adapted to receive an end of the rear axle 27 of the vehicle, the brake drum 28 being riveted to the flanged portion 26. A bolt 29 having a threaded recess 30 in its end is inserted into the outer end of the shaft extension and receives the threaded end 27' of the drive shaft, this bolt being locked in position by means of the set screw 29'. Roller bearings 31 are inserted between the extension shaft and the sleeves 23. Between the sleeves a sprocket wheel 32 is secured to the shaft by means of a key 32'. The frames 19 are formed on their upper and lower edges with inwardly extending lugs 33 which receive adjustment screws 34 bearing on opposite sides of each of the sleeves. Access to the screws may be had through hand holes 35 in the side plates 2 which are normally closed by covers 36. It will be apparent that by means of these screws the elevation of the bearings may be adjusted with respect to the frame, whereby the effective height of the device may be varied to suit requirements.

To the inner face of each side plate is fixed a curved angle bar 37 which extends in parallelism with the corresponding bar 6 and around the shafts 7 and 25, as shown in Figure 5. Curved track members 38, which are also angle irons, are riveted to the side plates in parallelism with the portions of the bar 37 between the shaft 35 and the shaft 7. An endless sprocket chain 39 is passed around the wheels 12 and 32. Certain of the links 40 of this chain are equipped with webs 41 having lateral extensions 42 to which are bolted tread members 43. The ends of these members are reduced as at 44 for receiving channel pieces 45 secured thereto by bolts 46. A journal 47 is formed integral with the pieces 45 and has fixed thereon a hub 48 which is spaced from the channel piece by means of a washer 50. The hub is surrounded by a ball bearing 51 to the outer portion of which is secured a wheel rim 52. A hard rubber tire 53 surrounds the wheel rim. The wheels thus formed at the ends of each of the tread members 43 travel on the continuous tracks 37 and also bear against the angle bars 6 and 38. Side plates 2 are rigidly held the required distance apart by means of suitable tie rods 54 and sleeves 49, as shown in Figure 11.

To the forward end of each of the side plates is riveted a bracket 55, these brackets having connected thereto converging straps 56 which are joined to a lug 57 formed on a screw cap 58. Within the cap is threaded one end of a cylinder 59, the other end of which is fitted with a screw cap 60 having a central aperture 61. A bracket 62 is secured to the underside of the running board or chassis 63 of the vehicle and supports an eye 64. A piston rod 65 which is connected to the eye extends into the cylinder 59 through the opening 61 and is provided at its inner end with a piston 66 adapted to slide within the cylinder. A coil spring 67 surrounds the rod 61 between the piston and the cap 60. By virtue of the connection between the forward end of each propulsion device and a portion of the chassis, the devices are caused to follow the line of travel of the vehicle. In these movements and during tilting of the devices upon the axle, the shock is taken up by the spring 67 within the cylinder.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A propulsion device comprising a frame including side members having openings formed therethrough, a frame surrounding each of said openings, a bearing member slidable in each of said openings, lugs formed on said frames, screws passed through said lugs and adapted to engage the bearing members, an extension shaft supported in said bearing members and adapted to be secured to the driving axle of a vehicle, a sprocket wheel keyed to said extension shaft, additional sprocket wheels supported by the frame, and a tread member surrounding said sprocket wheels.

2. A propulsion device comprising a frame including side plates, track members supported by said plates, shafts mounted in the frame, sprocket wheels mounted on the shafts, a tread member passed around said wheels, and provided at its ends with roller wheels adapted to travel in said tracks, and means for actuating said member from the driving axle.

In witness whereof I have hereunto set my hand.

EVANS GELLY.